Nov. 13, 1962   R. C. KNISELY   3,063,268
APPARATUS FOR PRODUCING GLASS ROD AND TUBING
Filed Dec. 15, 1958
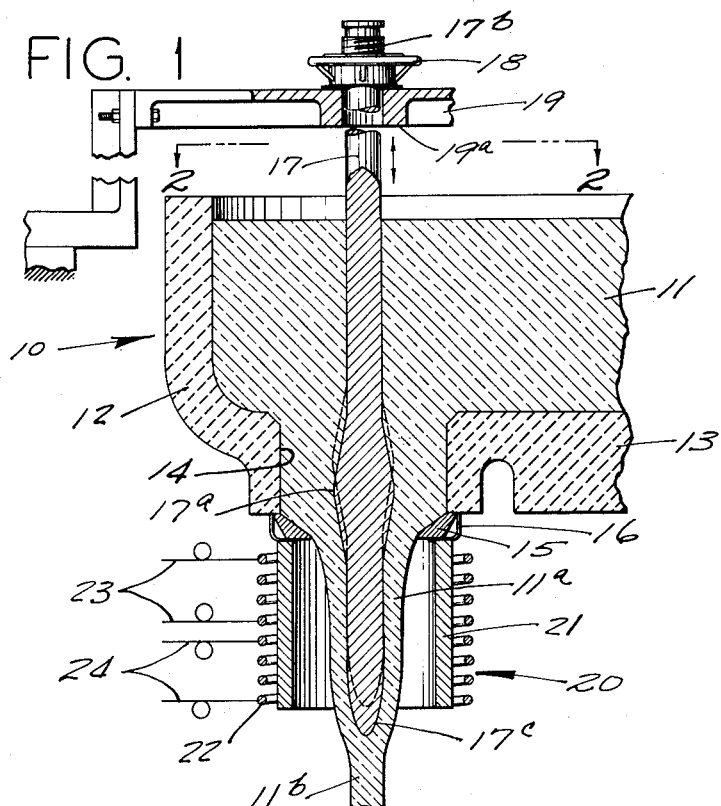
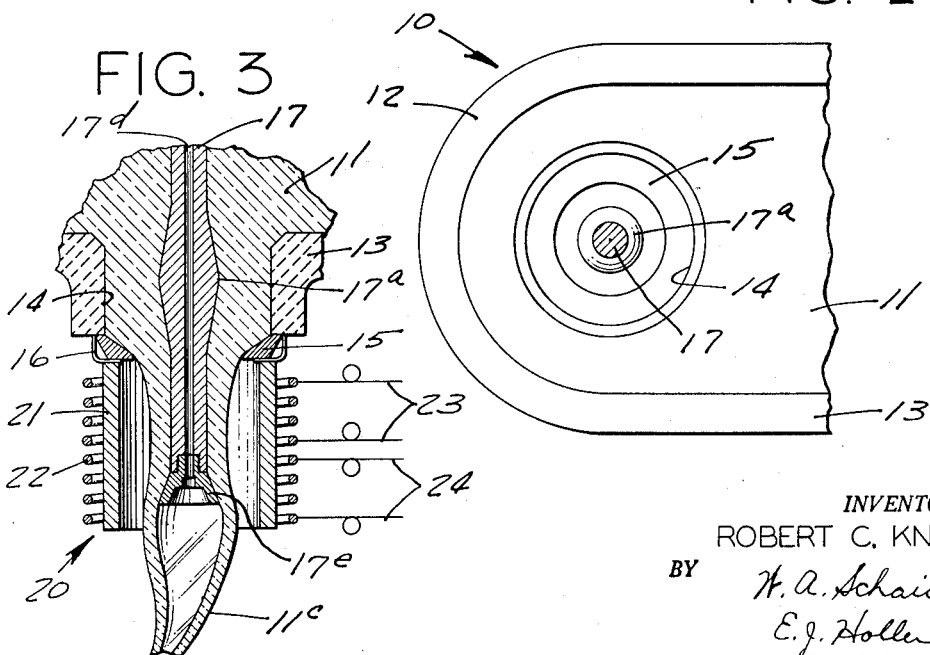
INVENTOR.
ROBERT C. KNISELY
BY
*H. A. Schaich &*
*E. J. Holler*
ATTORNEYS ![United States Patent Office](# )

3,063,268
Patented Nov. 13, 1962

---

3,063,268
APPARATUS FOR PRODUCING GLASS ROD AND TUBING
Robert C. Knisely, Vineland, N.J., assignor to Kimble Glass Company, a corporation of Ohio
Filed Dec. 15, 1958, Ser. No. 780,361
4 Claims. (Cl. 65—187)

My invention relates to apparatus and method for producing glass rod, cane or tubing by a continuous drawing process and provides an improvement over the apparatus disclosed, for example, in Patent No. 1,926,410 issued on September 12, 1933 to Soubier, assigned to the same parent assignee as the present application.

The referred to patent illustrates the formation of tubular glass only by utilizing a mandrel projecting through a furnace outlet wherein a considerable drop in temperature is obtained between the time the glass leaves the molten supply body and completion of tube formation following its delivery from the lower extremity of the mandrel. Control over the flow of molten glass issuing from an annular passageway is provided by a supplemental stirring device consisting of a conventional refractory sleeve surrounding the tube drawing mandrel, the sleeve having its lower end adjustably spaced above the floor of the forehearth. An air cooling device is employed beneath the outlet to supply a blast of pressurized cooling air to envelope and cool the glass on the lower portion of the mandrel. The mandrel has a uniform cross-section except for its lower extremity from which tubing only is drawn.

This form of tube drawing apparatus has not been entirely satisfactory in the manufacture or borosilicate or modified borosilicate glass compositions requiring high founding temperatures. The rotating sleeve member causes undesirable non-homogeneous molten glass to be periodically carried into the outlet orifice from the glass surface which results in glass of poor quality. Furthermore, refractory particles may occasionally separate from lower areas of the sleeve immersed within the molten glass and be carried into the glass product with objectionable results. Also in the production of borosilicate glasses in tubular or rod form it has been found that due to adverse cooling effects existing at the lower exposed portion of the mandrel additional heat must be applied to the glass thereat in accordance with the present invention in order to regulate and control accurately and effectively the temperature and dimensions of the glass product being drawn.

Accordingly, it is an object of the present invention to provide improved apparatus for controlling the rate of delivery and temperature of the glass as it is given initial cylindrical form in a continuous down-drawing process. In producing a cylindrical glass product by the apparatus and method herein disclosed precise control over both the volume of molten glass flowing from an outlet orifice and its temperature immediately following issuance therefrom may be maintained to facilitate the production of high quality glassware.

Another object of the present invention is to provide improved apparatus and method for continuously producing glass rod or tubing applicable to existing forehearth bowl structures for supplying molten glass in a continuous regulatable stream, the subject invention furnishing precise control over the formation of the resulting product by rapid cooling of the vitreous product to below its liquidus, but above its softening point temperature, while retained on or immediately below the lower portion of a cylindrical mandrel. Another object of the present invention is to provide improved apparatus for precisely controlling the rate of flow of molten glass from a delivery orifice of a supply body by a combined valving and shaping mandrel, the glass being thermally conditioned within prescribed limits while retained on the mandrel to facilitate continuous drawing in a downward direction of glass rod or tubing having a wide range of desired dimensions.

A still further object of the present invention is to provide a novel method of delivering a continuous uniform stream of molten glass downwardly through an adjustable annular orifice and thermally conditioning the glass on a cylindrical flow controlling and forming mandrel extending a substantial distance below the orifice by supplying additional heat thereto prior to drawing the product into final form.

The specific nature of this invention, as well as other objects and advantages thereof, will become apparent to those skilled in the art from the following detailed description taken in conjunction with the annexed sheet of drawings on which, by way of preferred example only, are illustrated the preferred embodiments of this invention.

In the accompanying drawings:

FIG. 1 is a fragmentary vertical sectional view of rod forming apparatus embodying the present invention.

FIG. 2 is a plan view of the apparatus taken along the line 2—2 of FIG. 1.

FIG. 3 is a fragmentary view similar to FIG. 1 of tube forming apparatus embodying the present invention.

In the drawings as shown in FIG. 1, forehearth extension 10 projects from a furnace (not shown) to contain the pool or supply body of molten glass 11. Furnace extension or forehearth 10 is provided with an inlet interconnecting with the furnace or tank for receiving molten glass passing therefrom. Passage of the glass to the receiving end of forehearth 10 is controlled by a gate or overhead dam which projects into the glass by way of an opening in the forehearth cover, said gate serving to both control the forward flow of molten glass 11 and to skim an undesired upper layer therefrom. The gate or overhead dam may be adjusted vertically to desired elevation to provide the necessary depth of molten glass 11 in forehearth 10 to meet varying operating conditions.

A terminating region or boot 12 of the forehearth is provided with a bottom outlet opennig 14 through which the glass continuously issues. An orifice ring 15 retained by an annular support member 16 is attached to the lower end of outlet opening 14.

A mandrel 17 is positioned in vertical relation extending downward through the molten glass 11 in the forehearth and essentially through a central region of outlet opening 14 and orifice ring 15. An intermediate enlarged portion 17a of mandrel 17 forms with the walls of the outlet 14 and orifice ring 15 an annular passage through which the glass issues and by which it is given initial tubular formation. Mandrel 17 extends upwardly through an opening in the forehearth roof or cover (not shown) and at its upper end 17b is screw-threaded to receive a hand wheel 18 which is threaded thereon. Wheel 18 is employed to adjust the vertical position of mandrel 17 within the forehearth outlet.

An upper portion of mandrel 17 is journaled within a sleeve or casing region 19a of horizontal arm 19 which provides firm support therefor. Relative disposition of mandrel 17 within the outlet is obtained by rotating hand wheel 18 to obtain upward or downward movement of the mandrel. Thus, vertical adjustment of mandrel 17 provides positive location of its enlarged intermediate portion 17a above and within orifice ring 15 to control precisely the dimensions of the annular passage through which the molten glass 11 issues. Horizontal adjustment of mandrel 17 within ring 15 may also be effected by lateral movement of sleeve 19a. Thus, the vertical axes of ring 15 and mandrel 17 may be coincident or slightly offset, if desired, to vary the shape of the annular passage to control dimensions of the cylindrical product as drawn.

Mandrel 17 has a right-cylindrical shape through the major portion of its length and an enlarged intermediate portion 17a. Region 17a is dual frusto-conical in shape with surfaces smoothly converging with the uniform cross-section of the mandrel. The greatest cross-sectional dimension of enlarged intermediate portion 17a is less than the internal dimension of orifice ring 15 and considerably less than the inner dimension of forehearth opening 14. The greatest cross-scectional area of enlarged portion 17a is normally disposed above orifice ring 15. Elevating the enlarged mandrel portion 17a into the raised position indicated by broken lines (FIG. 1) provides a greater annular passage and thus a greater flow of issuing glass, while lowering the mandrel restricts the annulus to decrease the flow of glass.

The lower portion 17c of mandrel 17 which is also right-cylindrical in shape extends a substantial distance below orifice ring 15 to provide for shaping the glass following its issuance from the annular passage and to control lowering of the glass temperature while in contact with the mandrel. The lower extremity 17c of the mandrel has a blunt-nosed converging shape as shown in FIG. 1 for forming rod or cane 11b. As shown, the glass product is drawn downwardly therefrom.

An annular heating jacket 20 which is composed of a refractory sleeve 21 surrounded by electrical resistance heating element 22 surrounds the lower portion of the mandrel and glass thereon immediately below orifice ring 15. Terminals 23 and 24 are employed to provide electrical current to the resistance element 22 to maintain desired glass temperatures on the lower mandrel region. Element 22 may consist of one or more helical coils extending around sleeve 21.

Precise flow control of low viscosity fluid glass is secured at the orifice level or elevation in the above described construction. Bowl opening 14 is considerably larger than the outside diameter at the maximum enlargement of mandrel cone 17a so that above orifice ring 15 the glass is extremely fluid due to its mass thereat.

Mandrel 17 is normally retained stationary in its vertical position during down drawing of glass product 11b therefrom. The glass is conditioned on the lower region of mandrel 17 or immediately therebelow so that it is cooled rapidly through its liquidus temperature to eliminate devitrification of the glass. The glass is maintained above its softening point temperature thereat so that it may be reduced to desired cross-sectional dimensions by the continuous drawing.

The subject apparatus may be employed in drawing borosilicate glass, for example, having a composition consisting of about 80.6% $SiO_2$; 13.0% $B_2O_3$; 2.2% $Al_2O_3$; 4.1% $Na_2O$; and the normal minor constituents comprising the balance. In drawing 5 millimeter diameter rod of the given composition, the temperature of the glass at the orifice level has been measured as approximately 2120° F. and that immediately below the lower extremity of the mandrel about 1990° F. indicating a rapid reduction in temperature of the glass through the controlled cooling zone. In producing rod of the same composition having 10 mm. diameter the temperature of the glass has been measured as 1990° F. at the orifice level and 1950° F. below the lower extremity of the mandrel. Further, in making 15 mm. diameter rod the orifice level temperature of the glass has been measured at 2070° F. and below the mandrel at 1880° F. The particular glass has a liquidus temperature of about 1920° F. which indicates the desirability of the glass being controllably cooled through its liquidus temperature in the area where issuing from the mandrel to produce a desirable product.

FIG. 3 illustrates a modification of the present invention wherein mandrel 17 is provided with an axial opening 17d and a flaring lower extremity 17e which may be screw-threaded into a lower end of the mandrel. Thus, either a convergent solid plug as shown in FIG. 1 or a hollow flaring tool 17e as shown in FIG. 2 may be attached to the lower end of the mandrel. The outwardly flaring lower extremity of mandrel 17 is preferable for drawing larger sizes of tubing although this region may be right-cylindrical or convergent with an axial opening for drawing smaller sizes of tubing.

As described above the enlarged intermediate portion 17a of the mandrel is employed within and above orifice ring 15 to regulate glass flow through the annular passage. Heating jacket 20 is utilized to surround the lower region of the mandrel and glass thereon. The glass is thermally conditioned on the mandrel and by controlling its cooling through its liquidus temperature to considerably above its softening temperature controlled drawing of glass tubing is permitted. This may be accomplished either in catenary form (FIG. 3) or directly downwardly as the rod shown in FIG. 1. Pressurized fluid is introduced through the axial opening 17d in the mandrel to control the dimensions and wall weight of the tube 11c as drawn.

As described in the foregoing specification the unitary mandrel 17 is adapted to provide both control over the issuance of molten glass from the orifice and thermal condition of the glass as initially formed. The mandrel in conjunction with a suitable orifice ring 15 is applicable to utilization with existing forehearth bowls without extensive modification thereto.

Summarily, the method of continuously drawing the glass product may be achieved by uniformly controlling the flow of glass in a downward direction from the outlet opening of a refractory container. An enlarged dual frusto-conical shaped intermediate portion of the mandrel is disposed immediately above the orifice ring to provide an adjustable annular passage. The mandrel has a lower region extending a substantial distance below the orifice upon which the glass is both initially shaped and conditioned by rapid cooling below its liquidus temperature either thereon or immediately therebelow. The glass product is shaped into final form by continuous drawing. The glass temperature on the lower mandrel portion is controlled by the supplemental heating jacket.

Various modifications may be resorted to within the spirit and scope of the appended claims.

I claim:

1. Apparatus for continuously drawing a lengthy cylindrical product such as glass rod or tubing comprising, in combination, a refractory container for retaining molten glass having a bottom outlet opening, an orifice ring of lesser internal diameter than said outlet opening disposed in a lower region thereof, a cylindrical mandrel projecting downwardly in a vertical direction into the glass through said outlet opening and orifice ring to provide in annular passageway through which the molten glass issues, said mandrel having an essentially uniform diameter over the major portion of its glass-contacting length and an enlarged intermediate submerged portion of lesser diameter than said orifice ring, said enlarged intermediate portion having essentially similar smoothly-contoured surfaces above and below its central area of maximum diameter comprising a dual frusto-conical shaped region, said enlarged portion being disposed substantially within said outlet opening with its central region of maximum diameter adjacent and immediately above said orifice ring, the lower portion of said mandrel below said enlarged intermediate portion extending a substantial distance below said orifice ring, means for adjusting the relative disposition of said mandrel within said outlet opening with respect to said orifice ring to control the flow of glass through said annular passageway, and means for controlling the temperature of the glass on said mandrel lower portion.

2. Apparatus for continuously drawing a thermoplastic material such as glass rod or tubing in a downward direction comprising, in combination, a refractory container for molten glass having a bottom outlet opening extending through the floor thereof, an orifice ring of lesser internal diameter than said outlet opening disposed at the lower extremity thereof, a cylindrical mandrel projecting downwardly into the glass through said outlet opening and orifice ring disposed in essentially coaxial alignment therewith to provide an annular passageway through which the glass issues, said mandrel having an essentially uniform diameter over its upper and lower glass-contacting portions with the latter extending a substantial distance below said orifice ring, said mandrel being retained by its upper portion above the surface of the molten glass, said mandrel having a dual frusto-conical shaped enlarged intermediate portion of lesser diameter than said orifice ring, said enlarged intermediate portion of said mandrel being disposed substantially within said outlet opening and immediately above said orifice ring to cooperate therewith, means for adjusting said mandrel with respect to said orifice ring in both vertical and horizontal directions to control the flow of glass through said annular passageway, and temperature controlling means consisting of a heating jacket surrounding the glass on the lower portion of said mandrel below said orifice ring.

3. The combination in accordance with claim 2, wherein the lower portion of said mandrel terminates in a smoothly-contoured converging extremity adapted to draw a rod-like product therefrom.

4. The combination in accordance with claim 2, wherein said mandrel has a central opening extending throughout its length adapted to conduct pressurized fluid therethrough, the lower portion of said mandrel terminating in an outwardly-flaring extremity adapted to draw a tubular product therefrom.

References Cited in the file of this patent

UNITED STATES PATENTS

| | | |
|---|---|---|
| 1,219,709 | Danner | Mar. 20, 1917 |
| 1,926,410 | Souber | Sept. 12, 1933 |
| 1,926,905 | Le Coultre | Sept. 12, 1933 |
| 1,933,341 | Richardson | Oct. 31, 1933 |
| 1,975,737 | Sanchez-Vello | Oct. 2, 1934 |
| 2,765,586 | Wilson | Oct. 9, 1956 |

FOREIGN PATENTS

| | | |
|---|---|---|
| 718,626 | France | Nov. 5, 1931 |
| 750,425 | France | May 29, 1933 |
| 526,561 | Germany | June 8, 1931 |